United States Patent
Stipins, III

(10) Patent No.: US 10,698,944 B2
(45) Date of Patent: Jun. 30, 2020

(54) SEARCHES AND RECOMMENDATIONS USING DISTANCE METRIC ON SPACE OF MEDIA TITLES

(71) Applicant: Netflix, Inc., Los Gatos, CA (US)

(72) Inventor: Janis Stipins, III, Gilroy, CA (US)

(73) Assignee: NETFLIX, INC., Los Gatos, CA (US)

( * ) Notice: Subject to any disclaimer, the term of this patent is extended or adjusted under 35 U.S.C. 154(b) by 593 days.

(21) Appl. No.: 13/801,646

(22) Filed: Mar. 13, 2013

(65) Prior Publication Data
US 2014/0280101 A1 Sep. 18, 2014

(51) Int. Cl.
*G06F 16/48* (2019.01)
*G06F 16/33* (2019.01)

(52) U.S. Cl.
CPC .......... *G06F 16/48* (2019.01); *G06F 16/3347* (2019.01)

(58) Field of Classification Search
CPC ......... G06F 17/30867; G06F 17/30058; G06F 17/3053; G06F 17/2745; G06F 17/30011; G06F 17/30038; G06F 17/30522; G06F 17/30554; G06F 17/30864; G06F 17/30994; G06F 17/3069; G06F 16/9535; G06F 16/44; G06F 16/4387; G06F 16/48; G06F 16/2457; G06F 16/248; G06F 16/904; G06F 16/951
USPC ................................................ 707/723, 724
See application file for complete search history.

(56) References Cited

U.S. PATENT DOCUMENTS

| | | | |
|---|---|---|---|
| 7,043,361 B1* | 5/2006 | Wall ...................... | G01C 21/20 340/988 |
| 7,216,289 B2* | 5/2007 | Kagle ..................... | G06F 17/24 707/E17.032 |
| 7,743,059 B2* | 6/2010 | Chan ...................... | G06Q 30/02 707/737 |
| 7,761,347 B2* | 7/2010 | Fujisawa ............... | G06K 7/0008 235/380 |
| 8,473,981 B1* | 6/2013 | Gargi ................. | G06F 17/30817 725/40 |
| 2003/0167263 A1* | 9/2003 | Sasaki .................. | G06F 17/3069 |
| 2006/0008151 A1* | 1/2006 | Lin ....................... | G06K 9/6292 382/190 |
| 2006/0251292 A1* | 11/2006 | Gokturk ............. | G06K 9/00375 382/103 |
| 2006/0291749 A1* | 12/2006 | Scheidhauer et al. ........ | 382/298 |
| 2007/0210937 A1* | 9/2007 | Smith .................... | G06Q 30/02 340/995.1 |
| 2008/0243815 A1* | 10/2008 | Chan et al. ...................... | 707/5 |

(Continued)

*Primary Examiner* — James Trujillo
*Assistant Examiner* — Fariborz Khoshnoodi
(74) *Attorney, Agent, or Firm* — Artegis Law Group, LLP

(57) ABSTRACT

Techniques are described for generating search results and content recommendations using a distance metric on a space of media titles. In one embodiment, each media title may be associated with metadata tags and represented by a vector which indicates those associated tags. The distance metric may measure distance as an angle between vectors representing media titles in a bent vector space that accounts for correlations between tags. Further, a non-linear scaling may be applied to the vectors representing media titles to correct for under-tagging and redundant tagging. Based on the distance metric, a search or recommendation application may generate search results and/or content recommendations and cause the same to be presented to a user.

22 Claims, 8 Drawing Sheets

(56) References Cited

U.S. PATENT DOCUMENTS

2009/0014520 A1* 1/2009 Kofman .......... G06K 19/06037
　　　　　　　　　　　　　　　　　　　　235/439
2010/0023506 A1* 1/2010 Sahni ................ G06F 17/30876
　　　　　　　　　　　　　　　　　　　　707/E17.014
2012/0219191 A1* 8/2012 Benzarti ............ G06Q 30/0201
　　　　　　　　　　　　　　　　　　　　382/106
2013/0132348 A1* 5/2013 Garrod ................ G06F 16/2372
　　　　　　　　　　　　　　　　　　　　707/648

* cited by examiner

SEARCHES AND RECOMMENDATIONS USING DISTANCE METRIC ON SPACE OF MEDIA TITLES

TECHNICAL FIELD

Embodiments presented in this disclosure generally relate to computer software. More specifically, embodiments presented herein relate to techniques for generating search results and content recommendations using a distance metric on a space of media titles.

BACKGROUND

A streaming media service generally includes a content server, a content player, and a communications network connecting the content server to the content player. The content server is configured to store (or provide access to) media files (or "streams") made available to end users. Each stream may provide a digital version of a feature length film, a television program, a sporting event, a staged or live event captured by recorded video, and the like. Streams also include media content created specifically for distribution online. Media playback by a client device is typically referred to as "streaming" because the content server transmits portions of a media file to the client device, which in turn decodes and initiates playback without waiting for the complete stream to be received.

To locate content to stream, a user may perform a "search" of media files available on the content server. In response to receiving a search query, the content server may determine a collection of media titles relevant to the search query and provide a webpage containing links which can be clicked to access one or more of the streaming media titles. In addition to query results, the content server may also provide a list of "recommendations" including, e.g., content which users would be interested in viewing.

It is not uncommon for users to search for media titles that are unavailable on content servers. One approach for providing results to such queries relies on past behavior of users to return relevant results. For example, the results might be determined based on media titles which were streamed by other users who entered the same query. Similarly, one approach for providing media title recommendations relies on past user behavior in, e.g., viewing certain titles after other titles. These approaches are unhelpful where records of past user behavior are lacking.

BRIEF DESCRIPTION OF THE DRAWINGS

So that the manner in which the above-recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OVERVIEW

Figure 1:
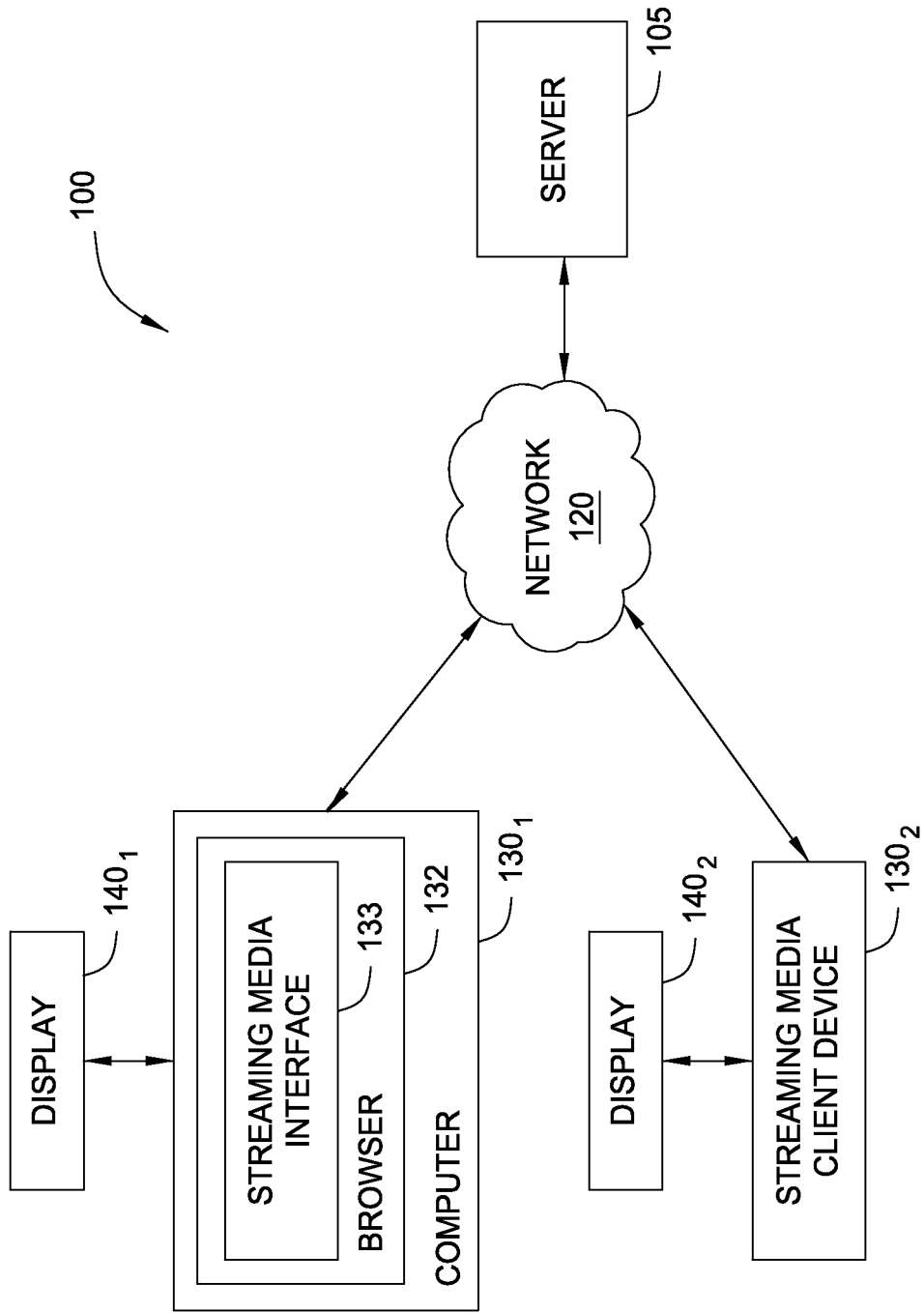
FIG. 1 illustrates an example computing infrastructure used to provide streaming media to a variety of client systems, according to one embodiment of the invention.

One embodiment of the invention includes a computer-implemented method for generating search results and content recommendations. The method includes receiving, for each of a plurality of objects, metadata tags describing the object. The method further includes determining distances between a plurality of first vectors, each representing a respective one of the plurality of objects based on the metadata tags describing the respective object, and a plurality of second vectors, each representing a respective one of the plurality of objects based on the metadata tags describing the respective object. Here, determining distances between the plurality of first vectors and the plurality of second vectors includes correcting for under-tagging and redundant tagging by non-linearly scaling the plurality of first vectors and the plurality of second vectors. In addition, the method includes generating content recommendations based at least on the determined distances.

Other embodiments include a computer-readable medium that includes instructions that enable a processing unit to implement one or more aspects of the disclosed methods as well as a system configured to implement one or more aspects of the disclosed methods.

DESCRIPTION OF EXAMPLE EMBODIMENTS

Embodiments of the invention provide techniques for generating search results and content recommendations using a distance metric on a space of media titles. The distance metric may be used to quantify a measure of similarity of media titles represented as a "distance" between the titles in a vector space. In turn, various algorithms may be applied to determine or improve search results and content recommendations based on the distances between titles.

In one embodiment, each media title may be associated with metadata tags describing the media title (e.g., as a "comedy," "romance," "sci-fi," etc.). In such a case, the media titles may be represented as vectors indicating tags associated with each media title, and the distance metric may measure distance as an angle between the vectors in a bent space. Here, basis vectors in the bent space that correspond to tags $T_i$ and $T_j$ may form an angle whose cosine is a correlation cor $(X_{T_i}, X_{T_j})$, where $X_{T_i}$ is a characteristic function for $T_i$ equal to 1 if a video is associated with tag $T_i$ and 0 otherwise, and $X_{T_j}$ is a similar characteristic function for $T_j$. In an alternative embodiment, the correlation may be determined based on the number of plays of media titles associated with tags $T_i$ and $T_j$. Here, the universe of plays may include plays of all users, or may be restricted to plays of a certain "cluster" of users (e.g., "sci-fi" enthusiasts).

In another embodiment, a non-linear scaling may be applied to vectors representing media titles. Geometrically, this may be equivalent to scaling the bent vector space, discussed above. In a particular embodiment, the $i^{th}$ coordinate of a given vector may be scaled by dividing by a coefficient of determination $k_i(V) = \Sigma(\text{cor}(X_{T_i}, X_{T_j})^2)$, where the sum is taken over j's for which $X_{T_j}$ appears in the vector V. Doing so corrects for under-tagging (e.g., lack of a "comedy" tag for a media title tagged as "funny") and redundant tagging (e.g., a single media title having both "comedy" and "funny" tags).

In yet another embodiment, the distance metric may measure distance using only those tags T which meet a statistical significance threshold. For example, the distance metric may consider tags whose sum of squared differences $\Sigma(p_U(T) - f(T))^2$ exceeds a threshold. Here, $f(T)$ is a fraction of media titles in a catalog which include tag T, and $p_U(T)$ is a fraction of media titles user U viewed that include tag T. A small sum $\Sigma(p_U(T) - f(T))^2$ may thus indicate that tag T corresponds to the preferences of very few users, and is thus unimportant to measuring similarity between media titles.

Distances determined according to techniques disclosed herein may be used in any feasible search, recommendation, data mining, or other algorithm. Such algorithms may include nearest neighbor algorithms, geometric clustering algorithms, hierarchical clustering algorithms, and the like. In some embodiments, the algorithms may generate search results or content recommendations which allow users to, e.g., find and view content that is relevant to their tastes. For example, media titles which are nearest neighbors to a media title viewed by a user may be presented as recommendations to that user.

Note, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas are not described in detail herein.

FIG. 1 illustrates an example computing infrastructure 100 used to provide streaming media content to client systems $130_{1-2}$, according to one embodiment. As shown, the computing infrastructure 100 includes a streaming media server system 105 and client systems $130_1$, $130_2$, each connected to a communications network 120.

The client systems $130_{1-2}$ communicate with the streaming media server system 105 over the network 120 to download streaming media titles. In this particular example, client system $130_1$ represents a computer system running a web-browser 132. Accordingly, client system $130_1$ is representative of desktop PCs, laptop computers, home-theater PCs (HTPCs), tablet computers, mobile telephones, and other computing systems capable of running a web-browser. The web-browser 132 is configured to obtain a streaming media interface 133 from the streaming media server 105, rendered on a display $140_1$, e.g., an LCD monitor.

Streaming media server 105 provides a computing system configured to transmit media streams (or links to media streams) to clients $130_{1-2}$. For example, streaming media server 105 may include a web-server, database, and application server configured to respond to requests for web pages and/or streaming media files received from web-browser 132. The content itself may be distributed from the streaming media server 105 or through broader content distribution networks. For example, in one embodiment, the streaming media server 105 may allow users to authenticate themselves to the streaming media provider (e.g., using a username and password). Once a given user is authenticated, the user may search for media titles by, e.g., entering text queries, and in response to receiving such queries, the streaming media server 105 may generate a set of relevant titles based, at least in part, on distances between media titles, and serve the list to the client device. Similarly, the streaming media server 105 may determine a list of media title recommendations titles based, at least in part, on distances between media titles, and serve the list to the client device. Lists of titles may be transmitted to the interface 133 as a set of links (e.g., HTTP URLs) to streaming media content available from the media server 105 (or related content distribution network). Logic included in the streaming media interface 133 may then begin downloading and playback for one of the titles accessed by one of the links.

Client system $130_2$ represents a set-top device connected to both network 120 and a display 140 (e.g., a flat-panel television). Accordingly, client system $130_2$ is representative of digital cable boxes, digital video recorder (DVR) systems, video game consoles, and other streaming media devices, as well as DVD players capable of connecting to a network 120 and receiving and playing back media streams provided by media server 105. For example, some Blu-Ray® disc players can download and execute BD-live applications. In such a case, the disc player could connect to the media server 105 and download interface components used to select and playback media streams. Further, display 140 may itself be an integrated device capable of connecting to the network 120 playing back media streams supplied by the media server 105. For example, some flat-panel television displays include integrated components used to connect to a streaming media service, video on demand services, or video sharing websites.

Figure 2:
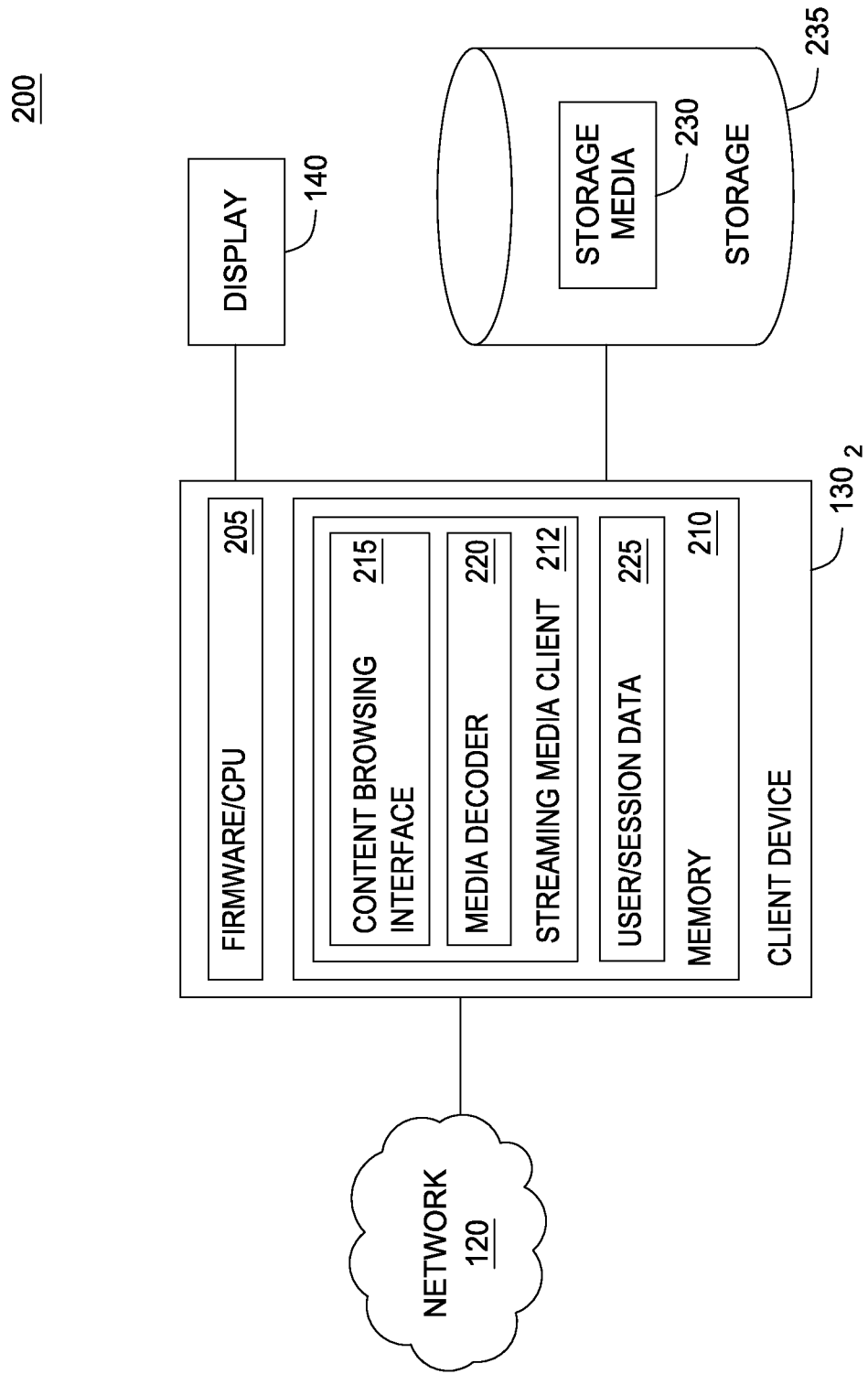
FIG. 2 illustrates an example client device used to enter search queries and to view streaming media content, according to one embodiment of the invention.

FIG. 2 illustrates an example of a client device $130_2$ used to view streaming media content, according to one embodiment. In this example, a streaming media client device is connected to both a display screen (e.g., a flat panel television) and a network. Accordingly, as shown, the client device $130_2$ is connected to both a network 120 and to a display 140. Note, client device $130_2$ is included to be representative of a cable-set top box, a digital video recorder (DVR), or television with integrated streaming functionality, as well as dedicated streaming devices (e.g., a Roku® device) connected to a television display. However configured, the client device $130_2$ may be capable of streaming media content from a variety of different service providers. Client device $130_2$ is also shown connected to a storage repository 235 of stored media 230, representing locally stored content that is available for playback on display 140.

In one embodiment, the client device $130_2$ is configured to allow users to view media content streamed over network 120 using a content browsing interface 215. As shown, the client device $130_2$ includes firmware 205, memory 210, and storage 235. The firmware 205 represents operating logic used to control the client device $130_2$. For example, the firmware 205 may be configured to allow users to schedule recordings, connect to streaming media services, select content for playback, etc. Content retrieved over the network 120 may be buffered in storage 235 prior to being decoded and presented on display 140.

Illustratively, the memory 210 includes user/session data 215 and a media client 212, which itself includes a media decoder 220 and a content browsing interface 215. The streaming media client 212 provides software on the client device $130_2$ used to access a given streaming media service. And the media decoder 220 is generally configured to decode and generate display frames from data streamed over the network 120, whether as part of content browsing interface 215 or otherwise. In one embodiment, the content browsing interface 215 may be configured to connect to a streaming media service, authenticate itself, e.g., using credentials entered by a user or stored as part of user/session data 225, and allow a user to select content to view on display 140.

Figure 3:
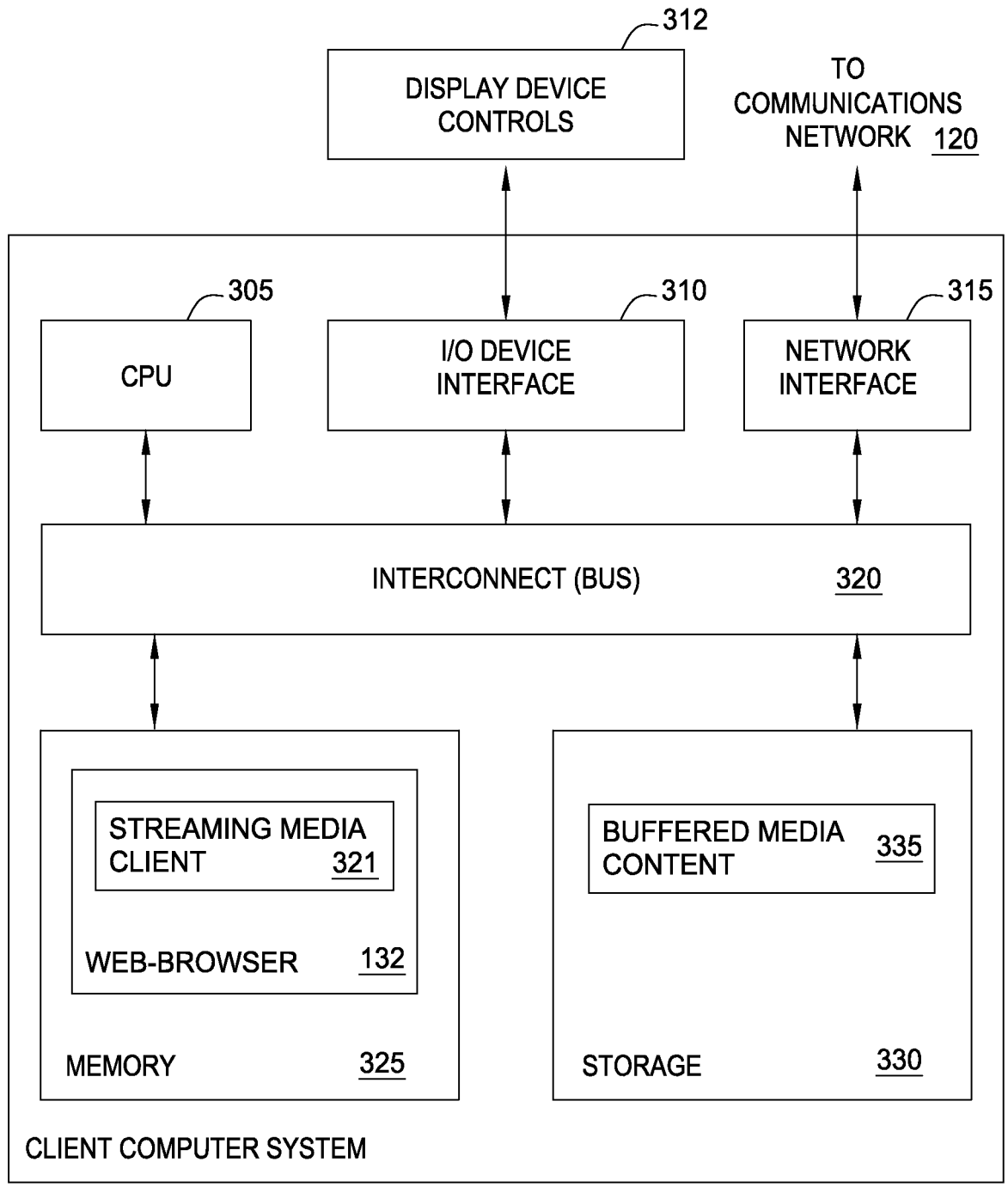
FIG. 3 illustrates an example computing system used to view streaming media content, according to one embodiment of the invention.

FIG. 3 illustrates an example of a client computing system $130_1$ used to view streaming media content, according to one embodiment. As shown, the client computing system $130_1$ includes, without limitation, a central processing unit (CPU) 305, a network interface 315, a bus 320, a memory 325, and storage 330. The computing system $130_1$ also includes an I/O device interface 310 connecting I/O devices 312 to the computing system $130_1$ (e.g., a keyboard, mouse, or remote control, along with a monitor (e.g., an LCD panel)).

CPU 305 is included to be representative of a single CPU, multiple CPUs, a single CPU having multiple processing cores, etc., and the memory 325 is included to be representative of a random access memory. The bus 320 connects CPU 305, I/O devices interface 310, storage 330, network interface 315, and memory 325. The network interface 315 is configured to transmit data via the communications network 120, e.g., to stream media from the server system 105. Storage 330, such as a hard disk drive or solid-state (SSD) storage drive, may store audio video data files along with other content.

Illustratively, the memory 325 includes a web browser 132, which itself includes a streaming media client 321, and the storage 330 stores buffered media content 335. The browser 132 provides a software application which allows a user to access web pages and other content hosted by a server. In particular, the browser 132 may permit the user to enter search queries for transmission to the server via the network 120. The streaming media client 321 generally corresponds to software components retrieved from a streaming media service in order to playback media content from that streaming media service. Content downloaded from the streaming media service may be stored in storage 330 (or in memory 325) as buffered media content 335 prior to being decoded and played back by streaming media client 321.

Figure 4:
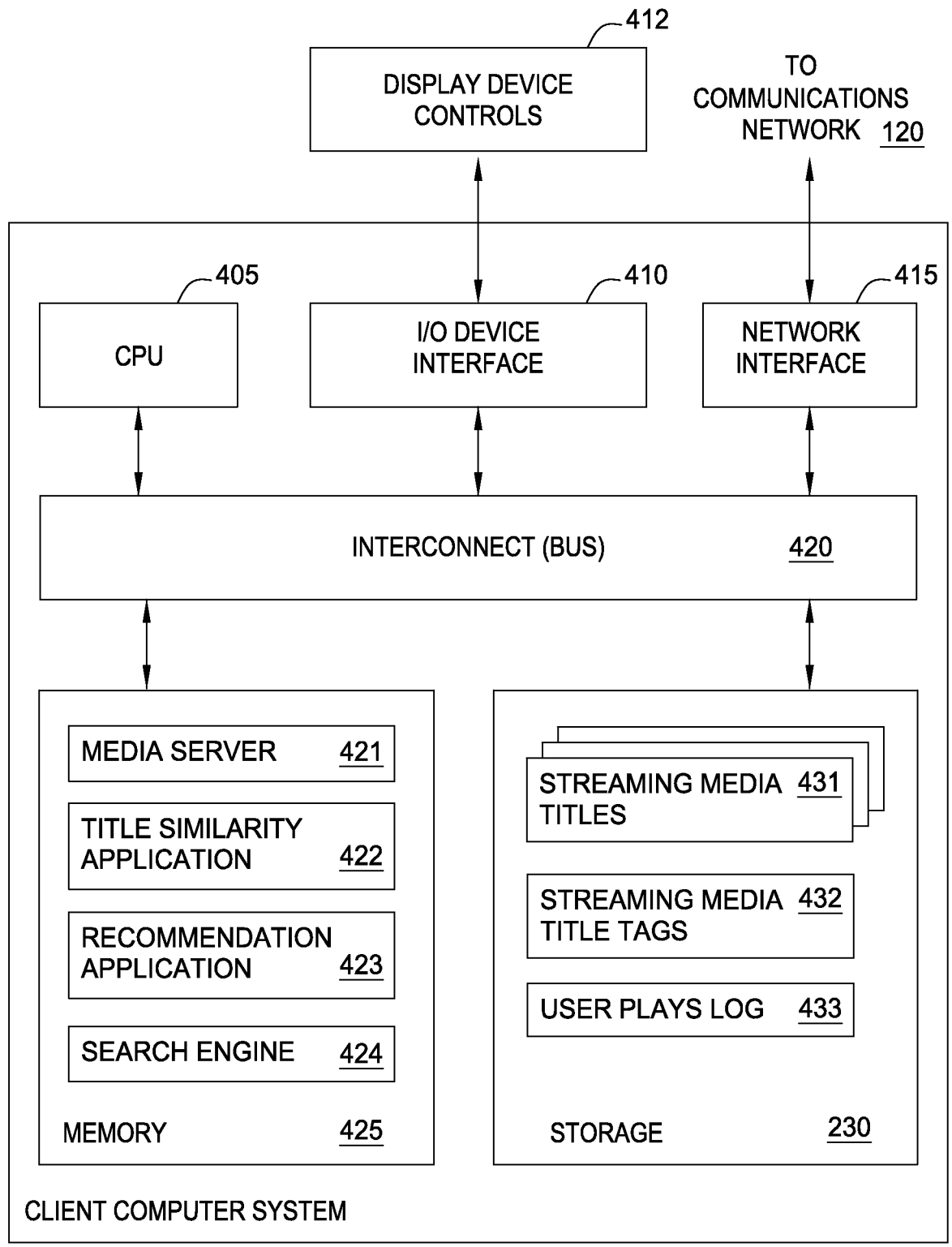
FIG. 4 illustrates an example computing system on which applications that determine search and content recommendations based on distances between media titles run, according to one embodiment of the invention.

FIG. 4 illustrates an example computing system on which applications that determine search and content recommendations based on distances between media titles run, according to one embodiment. As shown, computer server 105 includes, without limitation, a central processing unit (CPU) 405, a network interface 415, a bus 420, a memory 425, and storage 230. The content server system 105 also includes an I/O device interface 410 to devices 412 (e.g., keyboard, display and mouse devices).

CPU 405 retrieves and executes programming instructions stored in the memory 425. Similarly, CPU 405 stores and retrieves application data residing in the memory 425. The bus 420 is used to transmit programming instructions and application data between the CPU 405, I/O devices interface 410, storage 230, network interface 415, and memory 425. CPU 405 is included to be representative of a single CPU, multiple CPUs, a single CPU having multiple processing cores, and the like. And the memory 425 is generally included to be representative of a random access memory. The storage 230 may be a disk drive storage device. Although shown as a single unit, the storage 230 may be a combination of fixed and/or removable storage devices, such as magnetic disc drives, solid state drives (SSD), removable memory cards, optical storage, network attached storage (NAS), or a storage area-network (SAN).

Illustratively, the memory 425 includes a media server 421 which serves streaming media titles to client devices. Storage 230 includes streaming media titles 231, a user activity log 432, and media title metadata 440. Streaming media titles 231 provide a library of media content available for streaming. Accordingly, the streaming media titles 321 may include a collection of audio/video data encoded at various bitrates and stored on the content server system 105. Alternatively, the streaming media titles 231 may include metadata describing the actual media files, which may be made available from a content distribution network. In such a case, the media server 221 may be configured to, e.g., generate a license used by a client to obtain a given streaming media title from the content distribution network.

User plays log 432 is representative of one or more log files which store user/session data relating to plays (i.e., views) of media titles by users. For example, each entry in the log 423 may include a user ID, an ID of a media title played by the user, and a timestamp of when the play started.

As shown, the memory 425 also includes a title-to-title similarity application 424 which determines distances between a given pair of media titles using a distance metric on the space of media titles. In some embodiments, the title-to-title similarity application 424 may determine distances according to method 600, discussed below. Distances determined by the title-to-title similarity application may be used in various search, recommendation, data mining, and other algorithms which rely on the measure of geometric distance, as defined herein. Although depicted as distinct from search engine 424 and recommendation application 423, the title-to-title similarity application 424 may, in alternative embodiments, be integrated (e.g., as a function) in those applications.

Distances between titles may have a number of useful applications. For example, the distances may be used in generating search results, media title recommendations, and the like. As shown, the memory 425 includes the search engine 424 configured to generate search results based, at least in part, on distances between media titles. Illustratively, the memory 425 also includes the recommendation application 423 configured to generate content recommendations based, at least in part, on distances between media titles. In some embodiments, the recommendation application 423 and search engine 424 may generate search results and recommendations, respectively, according to method 700, discussed below.

Searches and Recommendations Based on Title-to-Title Distances

As discussed, a title-to-title similarity application may determine distances between titles in a space of media titles. Distances between titles may themselves be used to determine or improve search results and content recommendations, thereby permitting users to, e.g., find and view content which is more relevant to their tastes.

Figure 5:
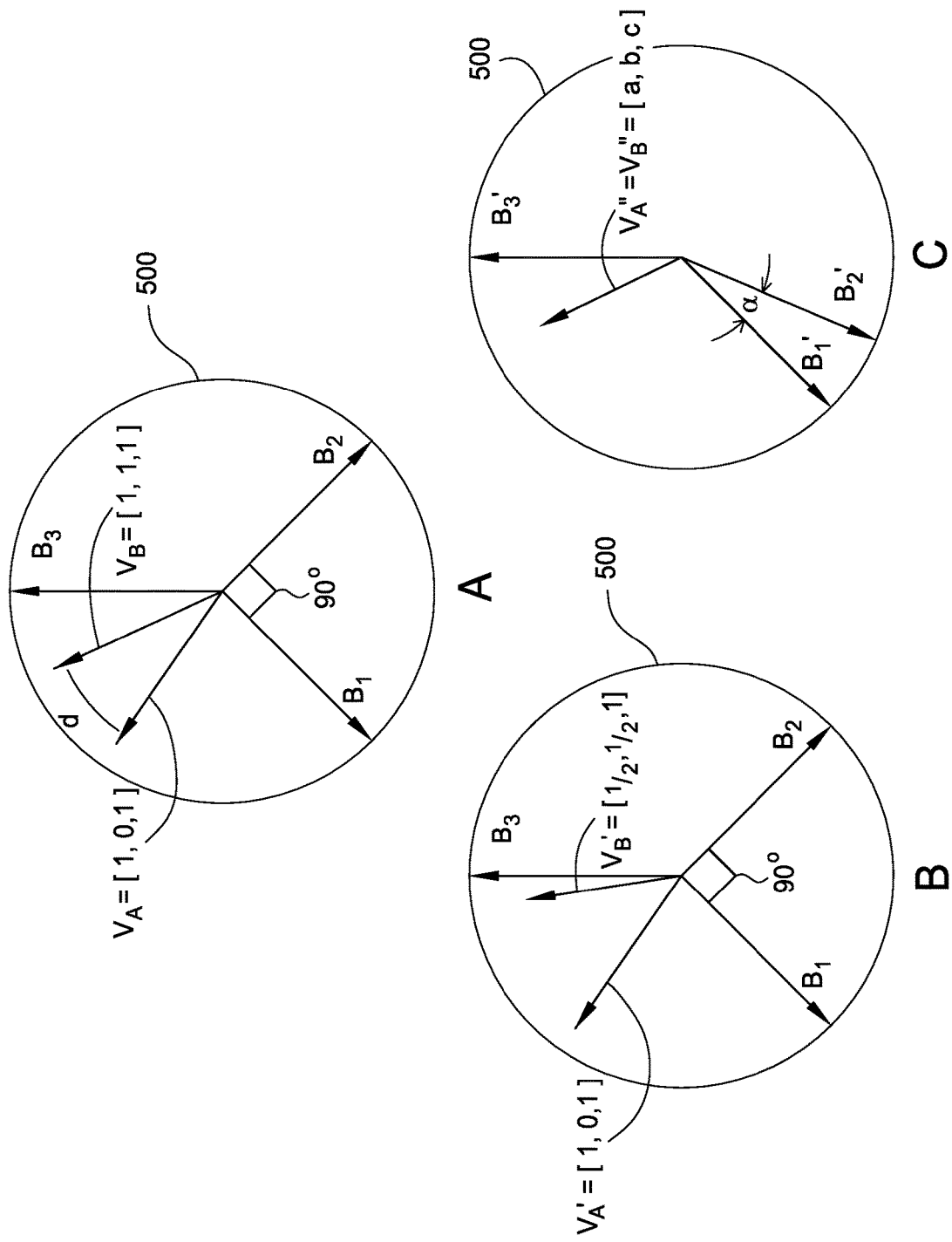
FIG. 5 illustrates an approach for determining angular distance, according to one embodiment of the invention.

FIG. 5 illustrates an approach for determining angular distance, according to an embodiment. As shown, panel A depicts a unit sphere 500 and basis vectors $B_{1-3}$, each of which corresponds to a respective metadata tag $T_{1-3}$ that may be used to describe media titles. Example metadata tags include "comedy," "sci-fi," "funny," "Harrison Ford," and the like. A person or computer program may "tag" any given media title with one or more of the tags $T_{1-3}$, thereby associated the media title with those tags. Further, any given media title may be represented as a vector of ones and zeroes, with the ith element a one if and only if the media title is associated with tag $T_i$. Illustratively, example vector $V_A=[1,0,1]$ indicates that a first media title is associated with tag $T_1$ and $T_3$, but not tag $T_2$. In contrast, example vector $V_B=[1,1,1]$ indicates that a second media title is associated with all three tags $T_{1-3}$.

One notion of distance between media titles represented by vectors $V_1$ and $V_2$ is Euclidean distance, which is given by vector subtraction:

$$d(V_1,V_2)=\|V_1-V_2\|=\sqrt{(V_1-V_2)\cdot(V_1-V_2)}, \quad (1)$$

However, using this simplistic metric does not make intuitive sense for determining similarity between media titles. Consider media titles $V_1$ and $V_2$ that differ by exactly one tag. The Euclidean distance between $V_1$ and $V_2$ is constant (in fact, 1) regardless of the number of tags that $V_1$ and $V_2$ share in common. Yet, intuitively, the distance between titles having more tags in common should be less than the distance between titles having fewer tags in common, because the former are more "similar" than the latter.

A better measure of distance between vectors $V_1$ and $V_2$ is angular distance:

$$D(V_1, V_2) = \arccos\left[\frac{V_1 \cdot V_2}{\|V_1\|\|V_2\|}\right]. \quad (2)$$

This measure of distance satisfies the criteria for a metric on a metric space, namely non-negativity, identity, symmetry, and triangle inequality:

$$d(V_1,V_1)=0 \quad (3)$$

$$d(V_1,V_2)=d(V_2,V_1)\geq 0 \quad (4)$$

$$d(V_1,V_2)+d(V_2,V_3)\geq d(V_1,V_3), \quad (5)$$

which ensure that the measure of distance behaves in accordance with geometric intuition, and are further required by some algorithms (e.g., geometric clustering algorithms). Angular distance may be interpreted geometrically as the geodesic distance between vectors $V_1$ and $V_2$ after those vectors are normalized to lie on the unit sphere. Illustratively, the angular distance between vectors $V_A=[1,0,1]$ and $V_B=[1,1,1]$ in panel A is the geodesic distance d.

While the use of angular distance is an improvement over Euclidean distance, an orthonormal representation of tags may nevertheless conflict with our intuition where those tags are correlated. For example, two single-tag videos (i.e., videos represented by vectors having a single 1 corresponding to a tag) would have distance $$\frac{\pi}{2},$$

regardless of the particular tags, whereas, intuitively, videos having single tags which occur together more often (e.g., if "comedy" and "funny" tend to occur together) ought to be "closer" to each other than videos having single tags that occur together less often. In other words, basis vectors representing more highly correlated tags should be closer in distance to each other, and vice versa.

One embodiment accounts for correlations between tags by bending the vector space such that basis vectors representing more highly correlated tags are closer in angular distance, and vice versa. As illustrated in panel C, basis vectors $B_1'$ and $B_2'$, which represent highly correlated tags, have angular distance $$\alpha < \frac{\pi}{2}.$$

In a particular embodiment, $\alpha$ may equal arccos $(\text{cor}(X_{T_1}, X_{T_2}))$. Let characteristic function $X_{T(v)}$ be defined as follows:

$$X_{T(v)} = \begin{cases} 1 \text{ if } v \text{ has tag } T \\ 0 \text{ otherwise.} \end{cases} \quad (6)$$

$X_{T(v)}$ may be viewed as a random variable on the set of videos, with expectation value $E(X_T)$ and variance $\text{var}(X_T)$:

$$E(X_T) = \frac{\text{number of videos with tag } T}{\text{total videos}} \quad (7)$$

$$\text{var}(X_T) = E(1-E) \quad (8)$$

Here, the variance is maximal when $$E = \frac{1}{2},$$

and tends to zero as E moves away from ½ toward 0 or 1. The standard deviation $\text{sd}(X_T)$ is simply the square root of the variance.

A pair of characteristic functions $X_{T_1}$ and $X_{T_2}$ has covariance:

$$\text{cov}(X_{T_1},X_{T_2})=E(X_{T_1}X_{T_2})-E(X_{T_1})E(X_{T_2})=p_{12}-p_1p_2, \quad (9)$$

where $p_i$ is the fraction of media titles associated with tag $T_i$, and $p_{12}$ is the fraction of media titles associated with both tags $T_1$ and $T_2$. The correlation of characteristic functions $X_{T_1}$ and $X_{T_2}$ is their covariance normalized by the product of their standard deviations:

$$\text{cor}(X_{T_1}, X_{T_2}) = \frac{\text{cov}(X_{T_1}, X_{T_2})}{\text{sd}(X_{T_1})\text{sd}(X_{T_2})}, \quad (10)$$

where $\text{sd}(X_{T_i})=\sqrt{p_i(1-p_i)}$. Note, the correlation is always between −1 and 1, which permits the following bent vector space: given two tags $T_1$ and $T_2$, corresponding basis vectors $B_1$ and $B_2$ form an angle whose cosine is $\text{cor}(X_{T_1}, X_{T_2})$. To satisfy this criterion, one embodiment computes angular distance using the following (non-standard) inner product:

$$\langle V_1, V_2 \rangle_R = V_1^T R V_2, \quad (11)$$

where R is a correlation matrix whose (i, j) value is $\text{cor}(X_{T_i}, X_{T_j})$. Note, if R were the identity matrix, then $\langle V_1,$ $V_2 \rangle_R$ would be the usual dot product. The inner product $\langle V_1, V_2 \rangle$, may also be used to determine the norm of vectors in the usual manner:

$$\|V\|_R = \sqrt{\langle V, V \rangle_R}. \quad (12)$$

Returning to equation (2), angular distance between two vectors may be defined with respect to R by replacing the dot product and norm with the inner product of equation (11) and the norm of equation (12), respectively, as follows:

$$d(V_1, V_2) = \arccos\left[\frac{\langle V_1, V_2 \rangle_R}{\sqrt{\langle V_1, V_1 \rangle_R \langle V_2, V_2 \rangle_R}}\right]. \quad (13)$$

Because correlation matrices are positive semi-definite, it follows that this notion of angular distance, as well as the norm of equation (12), satisfy the properties (3)-(4).

As discussed, the distance metric of equation (13) accounts for correlations between tags. One embodiment further corrects for under-tagging and redundant tagging (i.e., tagging with highly correlated tags) by applying non-linear scaling to vectors representing media titles. Geometrically, this may be equivalent to scaling the bent vector space, discussed above. Illustratively, basis vectors $B_1$ and $B_1$ may correspond to tags which are redundant, such as a "comedy" tag and a misspelled "comdy" tag. In panel A, vector $V_A$ represents a media title associated with the tag corresponding to $B_1$, but not the tag corresponding to $B_2$ (e.g., a title tagged with "comedy," but not "comdy"). In contrast, vector $V_B$ represents a media title associated with both the tags corresponding to $B_1$ and $B_2$ (e.g., a title tagged with "comedy" and "comdy"). Vector $V_A$ thus represents an "under-tagged" media title which should be tagged with, e.g., both "comedy" and "comdy," as a media title that is a "comedy" is also a "comdy." Conversely, $V_B$ represents a media title having redundant tags such as "comedy" and "comdy," one of which is unnecessary. Intuitively, the distance between $V_A$ and $V_B$ should be close, as their respective media titles share the same tags, except the redundant tag corresponding to $B_2$. However, this is unachievable using equation (13) if vectors $V_A$ and $V_B$ simply include 1s and 0s representing tags associated (and not associated) with media titles, as illustrated in panel A. Note, for highly anti-correlated tags (as opposed to redundant tags), analogous problems may arise.

To correct for under-tagging and redundant tagging, one embodiment applies the following non-linear scaling to vectors representing media titles: the ith coordinate of the vector is scaled by dividing by a coefficient of determination $k_i(V) = \Sigma(\text{cor}(X_{T_i}, X_{T_j})^2)$, where the sum is taken over j's for which $X_{T_j}$ appears in the vector V. In this definition of $k_i(V)$, the square of the correlation between $X_{T_i}$ and $X_{T_j}$ may be interpreted as the fraction of $X_{T_i}$'s variance which is attributable to the variance of $X_{T_j}$. As a result, the sum $k_i(V)$ is the total "attribution" of $X_{T_i}$'s variance among all tags occurring in V, including a term 1 from $X_{T_i}$ itself. The reciprocal of $k_i(V)$ may be interpreted as the fraction of the total "attribution" from $X_{T_i}$ itself.

In panel B, vectors $V_A$ and $V_B$ are scaled, becoming vectors $V_A'$ and $V_B'$, in panel B. As shown, the scaling of the redundant tag component (e.g., a "comedy"/"comdy" component) of vector $V_B$ produces $$\left[\frac{1}{2}, \frac{1}{2}\right],$$

while the scaling of the same component of vector $V_A$ produces [1,0] (i.e., no change). This assumes a correlation of 1, and, in other cases, scaled vectors may have different values. As shown in panel C, vectors $V_A'$ and $V_B'$ may map to vectors $V_A''$ and $V_B''$ in the bent space in which two tags $T_1$ and $T_2$, corresponding basis vectors $B_1$ and $B_2$ form an angle whose cosine is $\text{cor}(X_{T_1}, X_{T_2})$. As a result, the inner product of vectors $V_A''$ and $V_B''$ according to equation (13) gives the desired distance, 0. Note, although discussed above with respect to a mapping of vectors $V_1'$ and $V_2'$ to vectors $V_1''$ and $V_2''$, the non-standard inner product of equation (11) eliminates the need for an actual transformation to the basis spanned by vectors $B_1'$, $B_2'$, and $B_3'$, which may be computationally expensive.

Although discussed above with respect to correlations cor $(X_{T_i}, X_{T_j})$ based on the number of media titles having tags $T_i$ and $T_j$, in alternative embodiments, the correlation may be determined based on other data, such as the number of plays of media titles. That is, in equation (9), $p_i$ may be, e.g., the fraction of views of media titles associated with tag $T_i$, while $p_{12}$ may be the fraction of views of media titles associated with both tag $T_1$ and tag $T_2$. The correlation of equation (10) would change accordingly, and the remaining computations may be based on such a correlation. In such a case, the resulting metric may emphasize tags that are present on roughly half of the plays, as opposed to half of the media titles; tags that are nearly always or nearly never present will be attenuated, regardless of how common they are for the total set of media titles. Note, the universe of plays may include plays of all users, or may be restricted to those of a certain "cluster" of users (e.g., "sci-fi" enthusiasts). The "cluster" of users may be determined in any feasible manner, such as based on demographics data, previous media titles played, etc. Restricting to a cluster of users may help emphasize distinctions which matter to those users while reducing the salience of tags that those users find uninformative. For example, the distance between vectors representing two sci-fi titles may be small when considering all users, as those users may regard both films to be "sci-fi." However, the distance may increase when the set of users is restricted to sci-fi enthusiasts if the sci-fi enthusiasts consider the two titles as belonging to, e.g., different sub-genres. This distance increase may result, e.g., from a de-emphasizing of a "sci-fi" tag and a greater emphasis on other tags more meaningful for sci-fi enthusiasts, such as "features robots" and "features aliens."

In yet another embodiment, the distance metric may measure distance using only those tags T which meet a statistical significance threshold. For example, tags for which a sum of squared differences $\Sigma(p_U(T)-f(T))^2$ is below a threshold may not be considered in the distance measurements. Here, f(T) may be a fraction of media titles in a catalog which include tag T, and $p_U(T)$ may be a fraction of media titles user U viewed that include tag T. A small $\Sigma(p_U(T)-f(T))^2$ may thus indicate that few users have a preference corresponding to tag T in particular. As a result, excluding tags for which $\Sigma(p_U(T)-f(T))^2$ is less than a threshold from consideration may eliminate negative effects that random and unuseful tags would otherwise have on the distance measurement. For example, a tag indicating whether films have lengths which are even or odd may be excluded, as the sum $\Sigma(p_U(T)-f(T))^2$ is likely to be close to zero over a random set of titles and user views.

Figure 6:
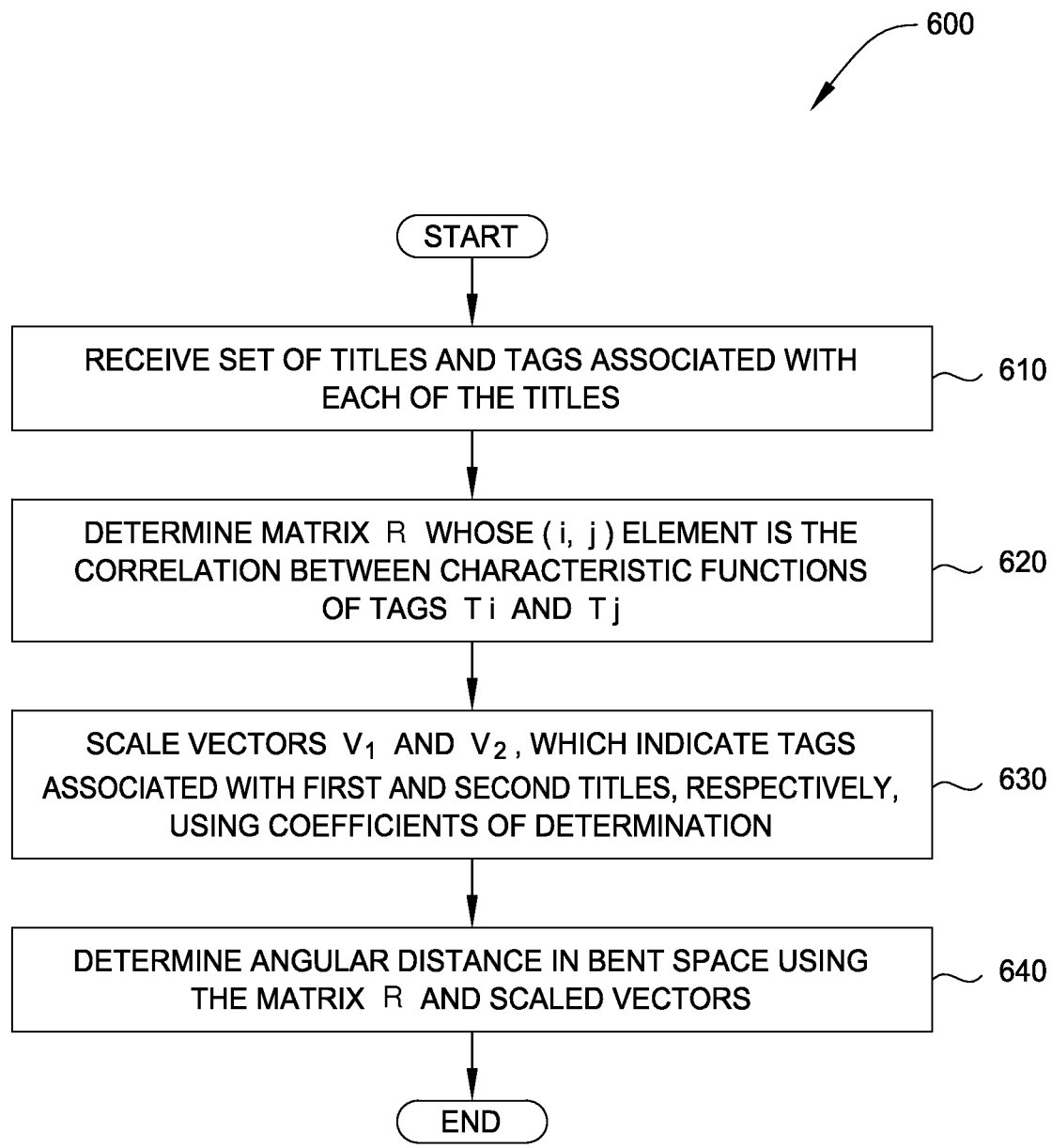
FIG. 6 illustrates a method for determining a distance between streaming media titles, according to one embodiment of the invention.

FIG. 6 illustrates a method 600 for determining a distance between streaming media titles, according to an embodiment. As shown, the method 600 begins at step 610, where a title-to-title similarity application receives a set of media titles and metadata tags associated with each of the titles. The metadata tags may be any tags which a human or machine associated with the media titles so as to describe those titles. Example tags include "comedy," "sci-fi," "funny," "Harrison Ford," etc.

At step 620, the title-to-title similarity application determines a correlation matrix R whose (i, j) element is the correlation between characteristic functions of tags $T_i$ and $T_j$ which are defined above in equation (6):

$$R = \begin{bmatrix} cor(X_{T_1}, X_{T_1}) & cor(X_{T_1}, X_{T_2}) & \cdots \\ cor(X_{T_2}, X_{T_1}) & \ddots & \cdots \\ \vdots & \vdots & cor(X_{T_N}, X_{T_N}) \end{bmatrix}, \quad (14)$$

where N is the total number of tags. As discussed, the correlation matrix R may be used in a (non-standard) inner product on a bent vector space, $\langle V_1, V_2 \rangle_R$.

At step 630, the title-to-title similarity application scales vectors $V_1$ and $V_2$, having ones and zeroes which indicate tags associated with a first title $T_1$ and a second title $T_2$, respectively, using the appropriate coefficients of determination. In particular, for a given vector V, the title-to-title similarity application may compute r(V) by dividing the ith coordinate of vector V by coefficient of determination $k_i(V) = \Sigma(cor(X_{T_i}, X_{T_j})^2)$, where the sum is taken over j's for which $X_{T_j}$ appears in the vector V.

At step 640, the title-to-title similarity application determines an angular distance in a bent space using the correlation matrix R and the scaled vectors r(V). Let $\langle r(V_1), r(V_2) \rangle_R = r(V_1)^T R \, r(V_2)$, where R is a correlation matrix whose (i, j) value is $cor(X_{T_i}, X_{T_j})$, be the inner product of $r(V_1)$ and $r(V_2)$ on the bent space. The norm of $r(V_i)$ would simply be $\|r(V_i)\|_R = \sqrt{\langle r(V_i), r(V_i) \rangle_R}$, and angular distance between two vectors with respect to R may be given by:

$$d(V_1, V_2) = \arccos\left[\frac{\langle r(V_1), r(V_2) \rangle_R}{\sqrt{\langle r(V_1), r(V_1) \rangle_R \langle r(V_2), r(V_2) \rangle_R}}\right]. \quad (15)$$

Although the method 600 is discussed above with respect to correlations cor $(X_{T_i}, X_{T_j})$ determined based on the number of media titles having tags $T_i$ and $T_j$, correlations in alternative embodiments may be based on other data. For example, the correlation may consider the number of plays of media titles having tags $T_i$ and $T_j$.

Although the method 600 is discussed above with respect to all N media title tags, in an alternative embodiment, the title-to-title similarity application may consider only those tags T which meet a statistical significance threshold. In one embodiment, the title-to-title similarity application may consider only those tags which meet a statistical significance threshold (e.g., for which a sum of squared differences $\Sigma(p_U(T) - f(T))^2$ exceeds a threshold). As discussed, doing so may eliminate from consideration those tags which do not correspond to any (or many) users' preferences, and are thus unimportant to measurements of distance between media titles.

Figure 7:
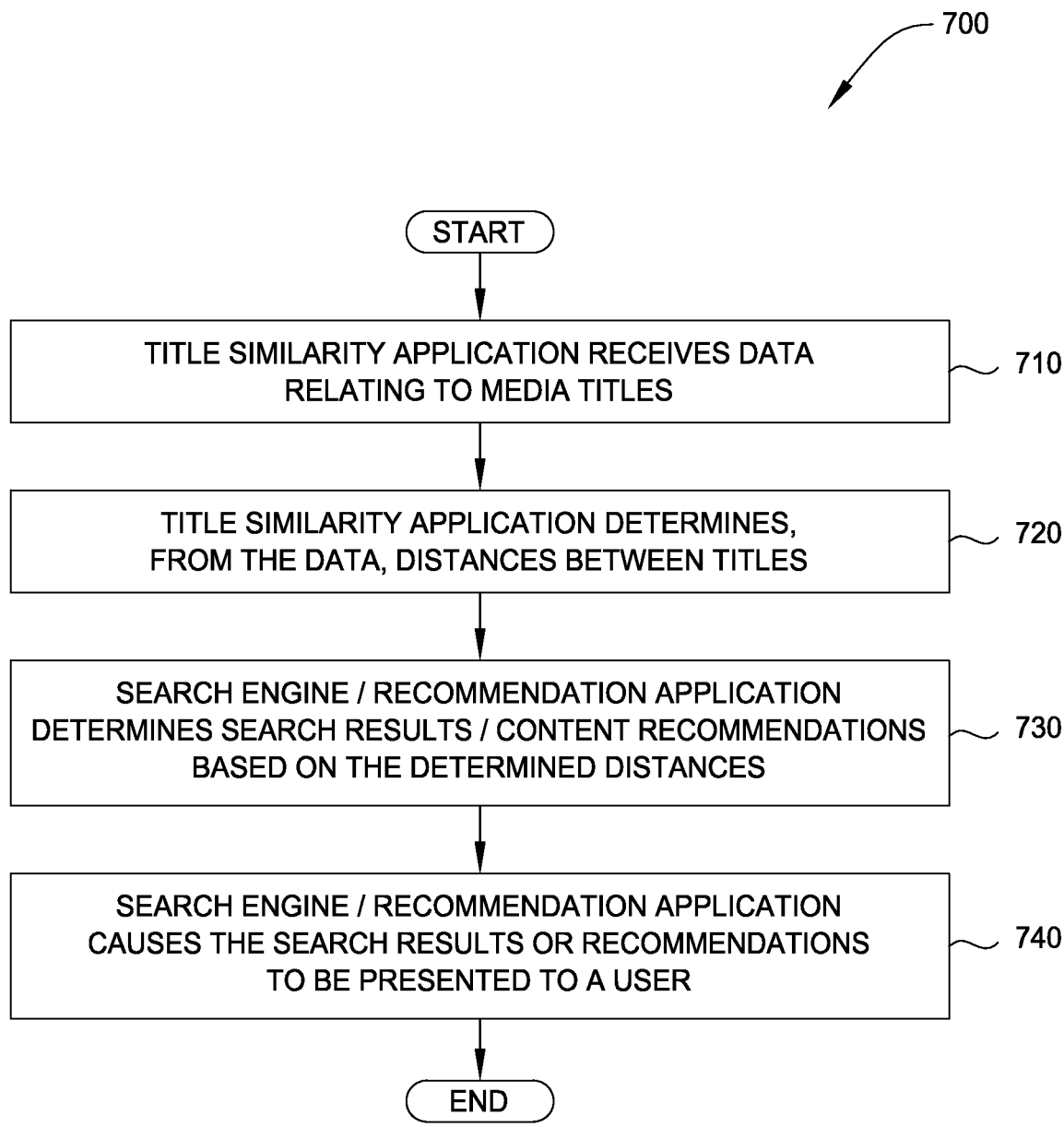
FIG. 7 illustrates a method for generating search results and recommendations based on distances between streaming media titles, according to one embodiment of the invention.

FIG. 7 illustrates a method for generating search results and content recommendations based on distances between streaming media titles, according to an embodiment. As shown, the method 700 begins at step 710, where a title-to-title similarity application receives data relating to media titles. The data may include metadata tags which describe the media titles, as well as the number of plays of the titles, information (e.g., user IDs, views of media titles, etc.) about users who viewed or played the titles, and the like.

At step 720, the title-to-title similarity application determines, from the data, distances between media titles. As discussed, the title-to-title similarity application may determine an angular distance in a bent vector space between scaled vectors according to equation (15). Use of angular distance and the bent vector space accounts for correlations between tags, which may be determined based on the number of media titles associated with tags, the number of plays (by all users or a user "cluster") of media titles with the tags, and the like. At the same time, scaling using coefficients of determination may correct for under-tagging and redundant tagging. In a further embodiment, the distance metric may measure distance using only those tags T which meet a statistical significance threshold (e.g., those tags for which a sum of squared differences $\Sigma(p_U(T) - f(T))^2$ exceeds a threshold), thereby eliminating from consideration those tags which do not corresponding to users' preferences, and are thus unimportant to measurements of distance between media titles.

In one embodiment, the title-to-title similarity application may be integrated (e.g., as a function) in a search engine or recommendation. In such cases, distances may be determined during the execution of various algorithms, which are discussed in greater detail below. Here, the correlation matrix R (and other values) may be pre-computed. For example, the correlation matrix may be determined based on available media titles, plays of those titles, etc., and then periodically updated to account for new media titles, additional plays, etc. Alternatively, the title-to-title similarity application may be a stand-alone application. In such a case, distances between media titles which the title-to-title similarity application determines may be stored, e.g., in a storage device or in memory. The stored distances may later be used to, e.g., provide search results or recommendations.

At step 730, a search engine or recommendation application determines search results or content recommendations, respectively, based on distances between media titles. Distances determined according to equation (15) may be used in any feasible search, recommendation, data mining, or other algorithm. Example algorithms include nearest neighbor algorithms, geometric clustering algorithms, hierarchical clustering algorithms, and the like. Such algorithms may themselves output search results or recommendations, or, alternatively, the outputs of such algorithms may be used to ultimately output search results or recommendations. For example, in the case of nearest neighbor algorithms, distances computed according to equation (15) may be used to determine a list of media titles which are "closest," in the space of media titles, to a particular media title which a user has played. Note, the algorithms may also make other considerations, such as text matches, in generating the search results and content recommendations.

At step 740, the search engine or recommendation application causes the search results or content recommendations to be presented to a user. For example, the search engine or recommendation application may generate a webpage which includes links to media titles determined at step 730. The server, on which the search engine or recommendation application runs, may then serve the webpage to the user's client device via a network, after which the user may view the webpage using a web browser.

Figure 8:
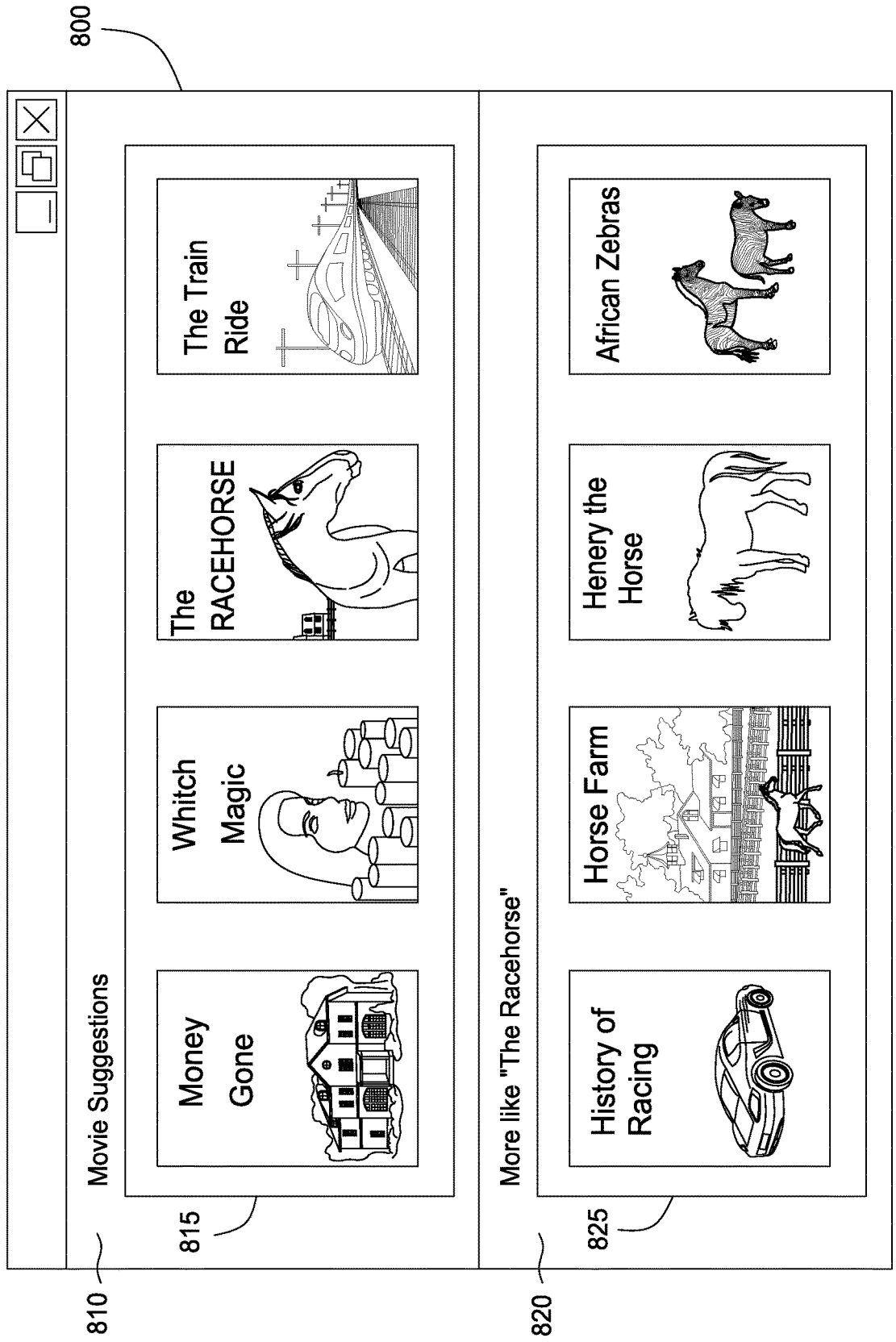
FIG. 8 illustrates an example user interface configuration for presenting recommendations determined based on distances between streaming media titles, according to one embodiment of the invention.

FIG. 8 illustrates an example user interface 800 configuration for presenting recommendations determined based on distances between streaming media titles, according to one embodiment of the invention. As shown, the user interface 800 includes a "Movie Suggestions" bar 810 which presents a list of recommended media titles 815, shown as icons.

Here, the titles appearing in the list of titles 815 may be determined in a manner similar to the method 700 for generating recommendations, discussed above. For example, the list 815 may include media titles which are nearest neighbors to titles a user has recently watched, and distance measurements used in determining the nearest neighbors may be computed according to equation (15), discussed above. Of course, media titles may also be chose which have greater distance from previously played titles to, e.g., provide variety.

Illustratively, the user interface 800 also includes a "More like 'The Racehorse'" recommendation bar 820 which presents recommendations of titles which are similar to a given title ("The Racehorse"). Similar to the recommendation bar 810, the recommendation bar 820 includes a list of titles 825, shown as icons. Further, titles appearing in the list of titles 825 may be determined in a manner similar to the method 700 for generating recommendations, discussed above. For example, the list 825 may include media titles which are in the same geometric cluster as "The Racehorse," which may be a title that a user recently played. Here, distance measurements used in determining geometric clusters may be computed according to equation (15), discussed above.

Although discussed above with respect to media titles and plays of the same, techniques disclosed herein may generally be applied to measure distances on spaces of any tagged objects, or sets of such objects. For example, a distance metric may be defined on a space of images, webpages, or sets thereof, and search results and recommendations generated using the distance metric, according to techniques disclosed herein. In such cases, "plays" may instead be, e.g., "views" by users of the images, webpages, etc. Although discussed above with respect to content recommendations and search results, search results may generally be considered a form of content recommendation, namely those recommendations made in response to a search.

Advantageously, techniques disclosed herein generate search results and recommendations based on measurements of distance, as opposed to records of past user behavior. Such techniques may work even where records of past behavior are unavailable. Further, techniques disclosed herein correct for under-tagging and redundant tagging, thereby reducing the impact of tagging errors on distance measurements. In addition, use of a non-standard inner product, as disclosed herein, eliminates the need for a change of basis transformation, which may be computationally expensive.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

I claim:

1. A computer-implemented method comprising:
   receiving, for each of a plurality of objects, metadata tags describing the object;
   determining distances between a plurality of first vectors, each representing a respective one of the plurality of objects based on the metadata tags describing the respective object, and a plurality of second vectors, each representing a respective one of the plurality of objects based on the metadata tags describing the respective object; and
   generating content recommendations based at least on the determined distances,
   wherein determining distances between the plurality of first vectors and the plurality of second vectors includes non-linearly scaling a first vector from the plurality of first vectors based on a correlation between the a first metadata tag describing a first object represented by the first vector and a second metadata tag describing a plurality of other objects, wherein the correlation is representative of how much of a variance of the first metadata tag is attributed to a variance of the second metadata tag.

2. The method of claim 1, wherein, for each pair of second and third vectors from the plurality of first and the plurality of second vectors, determining the distance between the pair of second and third vectors while correcting for under-tagging and redundant tagging includes:
   scaling elements of the second vector by coefficients of determination corresponding to the respective object represented by the second vector;
   scaling elements of the third vector by coefficients of determination corresponding to the respective object represented by the third vector; and
   determining an angular distance between the scaled second and third vectors.

3. The method of claim 2, wherein determining the angular distance includes determining a non-standard inner product on a bent vector space having basis vectors, each pair of which forms an angle equal to an arccosine of a correlation between characteristic functions of metadata tags which correspond to the respective pair of basis vectors.

4. The method of claim 3, wherein determining the non-standard inner product includes multiplying a product of a transposition of the scaled second vector and a correlation matrix by the scaled third vector.

5. The method of claim 4, wherein each correlation element in the correlation matrix is determined based on at least numbers of the objects described by each of a corresponding pair of the metadata tags.

6. The method of claim 4, further comprising, receiving plays of each of the plurality of objects, wherein each correlation element in the correlation matrix is determined based on at least numbers of plays of the objects described by each of a corresponding pair of the metadata tags.

7. The method of claim 6, wherein the plays are plays by a cluster of users.

8. The method of claim 2, further comprising:
   determining, for each of a plurality of users and each of the metadata tags, a square of a difference between a percentage of the plurality of objects described by the respective metadata tag and a percentage of plays by the respective user of objects described by the respective metadata tag; and determining sums of the squared differences over the plurality of users for each of the metadata tags, wherein the distance between the second vector and the third vector is determined based on only the metadata tags for which the corresponding sum of squared differences is below a predefined threshold.

9. The method of claim 1, wherein generating content recommendations includes determining at least one of a nearest neighbor, a geometric cluster, and a hierarchical cluster.

10. The method of claim 1, wherein the objects are media titles.

11. The method of claim 1, wherein the content recommendations are generated in response to a search.

12. A non-transitory computer-readable storage medium storing code for execution by a processor, wherein the code, when executed, performs an operation, comprising:

receiving, for each of a plurality of objects, metadata tags describing the object;

determining distances between a plurality of first vectors, each representing a respective one of the plurality of objects based on the metadata tags describing the respective object, and a plurality of second vectors, each representing a respective one of the plurality of objects based on the metadata tags describing the respective object; and generating content recommendations based at least on the determined distances, wherein determining distances between the plurality of first vectors and the plurality of second vectors includes non-linearly scaling a first vector from the plurality of first vectors based on a correlation between the a first metadata tag describing a first object represented by the first vector and a second metadata tag describing a plurality of other objects, wherein the correlation is representative of how much of a variance of the first metadata tag is attributed to a variance of the second metadata tag.

13. The computer-readable storage medium of claim 12, wherein, for each pair of second and third vectors from the plurality of first and the plurality of second vectors, determining the distance between the pair of second and third vectors while correcting for under-tagging and redundant tagging includes:

scaling elements of the second vector by coefficients of determination corresponding to the respective object represented by the second vector;

scaling elements of the third vector by coefficients of determination corresponding to the respective object represented by the third vector; and determining an angular distance between the scaled second and third vectors.

14. The computer-readable storage medium of claim 13, wherein determining the angular distance includes determining a non-standard inner product on a bent vector space having basis vectors, each pair of which forms an angle equal to an arccosine of a correlation between characteristic functions of metadata tags which correspond to the respective pair of basis vectors.

15. The computer-readable storage medium of claim 14, wherein determining the non-standard inner product includes multiplying a product of a transposition of the scaled second vector and a correlation matrix by the scaled third vector.

16. The computer-readable storage medium of claim 15, wherein each correlation element in the correlation matrix is determined based on at least numbers of the objects described by each of a corresponding pair of the metadata tags.

17. The computer-readable storage medium of claim 15, the operation further comprising, receiving plays of each of the plurality of objects, wherein each correlation element in the correlation matrix is determined based on at least numbers of plays of the objects described by each of a corresponding pair of the metadata tags.

18. The computer-readable storage medium of claim 17, wherein the plays are plays by a cluster of users.

19. The computer-readable storage medium of claim 13, the operation further comprising:

determining, for each of a plurality of users and each of the metadata tags, a square of a difference between a percentage of the plurality of objects described by the respective metadata tag and a percentage of plays by the respective user of objects described by the respective metadata tag; and determining sums of the squared differences over the plurality of users for each of the metadata tags, wherein the distance between the second vector and the third vector is determined based on only the metadata tags for which the corresponding sum of squared differences is below a predefined threshold.

20. The computer-readable storage medium of claim 12, wherein generating content recommendations includes determining at least one of a nearest neighbor, a geometric cluster, and a hierarchical cluster.

21. The computer-readable storage medium of claim 12, wherein the content recommendations are generated in response to a search.

22. A system, comprising:

a memory; and a processor storing one or more applications, which, when executed on the processor, perform an operation comprising:

receiving, for each of a plurality of objects, metadata tags describing the object, determining distances between a plurality of first vectors, each representing a respective one of the plurality of objects based on the metadata tags describing the respective object, and a plurality of second vectors, each representing a respective one of the plurality of objects based on the metadata tags describing the respective object, and generating content recommendations based at least on the determined distances;

wherein determining distances between the plurality of first vectors and the plurality of second vectors includes non-linearly scaling a first vector from the plurality of first vectors based on a correlation between the a first metadata tag describing a first object represented by the first vector and a second metadata tag describing a plurality of other objects, wherein the correlation is representative of how much of a variance of the first metadata tag is attributed to a variance of the second metadata tag.

* * * * *